United States Patent
Ross et al.

(10) Patent No.: US 12,130,909 B1
(45) Date of Patent: *Oct. 29, 2024

(54) ENTERPRISE SEARCH

(71) Applicant: FireEye, Inc., Milpitas, CA (US)

(72) Inventors: Steven Antonio Ross, Doylestown, PA (US); Ai Quoc Duong, Reston, VA (US); Larry Alan King, Potomac Falls, VA (US); John Patrick Young, Centreville, VA (US)

(73) Assignee: Musarubra US LLC, Plano, TX (US)

( * ) Notice: Subject to any disclaimer, the term of this patent is extended or adjusted under 35 U.S.C. 154(b) by 692 days.

This patent is subject to a terminal disclaimer.

(21) Appl. No.: 17/063,618

(22) Filed: Oct. 5, 2020

Related U.S. Application Data

(63) Continuation of application No. 15/803,669, filed on Nov. 3, 2017, now Pat. No. 10,795,991.

(60) Provisional application No. 62/419,422, filed on Nov. 8, 2016.

(51) Int. Cl.
*G06F 21/55* (2013.01)
*G06F 21/56* (2013.01)

(52) U.S. Cl.
CPC .......... *G06F 21/552* (2013.01); *G06F 21/561* (2013.01)

(58) Field of Classification Search
CPC ........ G06F 21/55; G06F 21/552; G06F 21/56; G06F 21/561
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |
| 5,319,776 | A | 6/1994 | Hile et al. |
| 5,440,723 | A | 8/1995 | Arnold et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Flexense, VX Search Rule-Based File Search, Jul. 2011, http://www.vxsearch.com/vxsearch_manual.pdf (Year: 2011).*

(Continued)

*Primary Examiner* — Khang Do
(74) *Attorney, Agent, or Firm* — Rutan & Tucker, LLP

(57) ABSTRACT

A method performed by an enterprise search system to conduct an automated, computerized search for select operational attributes of a plurality of network devices is shown. The method comprises initiating the search via a user interface based on receipt of input information, which is used to form a query. The method then determines based on the query, one or more audits each specifying one or more tasks to be performed by at least a first network device to search for the select operational attributes. Subsequently, the method makes the one or more audits available to the first network device via a network, and receives, from the first network device, one or more responses to the query. The method may include generating one or more filter conditions to apply to results of executing the one or more tasks to yield the select operational attributes when included in the results.

14 Claims, 7 Drawing Sheets

(56) References Cited

U.S. PATENT DOCUMENTS

| | | |
|---|---|---|
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,636,972 B1 | 10/2003 | Ptacek et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,127,358 B1 * | 2/2012 | Lee .................. G06F 21/56 |
| | | 726/25 |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,429,220 B2 * | 4/2013 | Wilkinson .......... H04L 67/1065 |
| | | 709/219 |
| 8,464,340 B2 | 6/2013 | Ahn et al. |
| 8,479,174 B2 | 7/2013 | Chiriac |

(56) References Cited

U.S. PATENT DOCUMENTS

| | | |
|---|---|---|
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,776,240 B1 * | 7/2014 | Wu .................. G06F 21/567 726/25 |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,826,424 B2 | 9/2014 | Lyne et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,893,114 B1 * | 11/2014 | Cooley ................. G06F 8/66 717/169 |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,003,533 B1 * | 4/2015 | Gummerman ........ G06F 21/566 707/685 |
| 9,009,822 B1 | 4/2015 | Ismael et al. |
| 9,009,823 B1 | 4/2015 | Ismael et al. |
| 9,015,832 B1 | 4/2015 | Lachwani et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,888 B1 | 1/2017 | McClintock et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,584,541 B1 | 2/2017 | Weinstein et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,635,049 B1 * | 4/2017 | Oprea .................. H04L 63/145 |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,690,937 B1 | 6/2017 | Duchin et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |

(56) References Cited

U.S. PATENT DOCUMENTS

| | | |
|---|---|---|
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,009,370 B1 | 6/2018 | Douglas et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,795,991 B1 | 10/2020 | Ross et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161653 A1 | 7/2006 | Webb et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |

(56) References Cited

U.S. PATENT DOCUMENTS

| | | |
|---|---|---|
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0046838 A1* | 2/2008 | Haub .................. G06F 16/907 715/810 |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Amastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1* | 8/2009 | Frazier .................. H04L 63/08 726/4 |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058432 A1 | 3/2010 | Neystadt et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0146291 A1 | 6/2010 | Anbuselvan |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0242106 A1* | 9/2010 | Harris .................. H04L 63/08 709/224 |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0191343 A1 | 8/2011 | Heaton et al. |

(56) References Cited

U.S. PATENT DOCUMENTS

| | | |
|---|---|---|
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0024933 A1* | 1/2013 | Jakobsson ............ G06F 21/567 726/22 |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160124 A1* | 6/2013 | St hlberg ............... G06F 21/56 726/24 |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130157 A1* | 5/2014 | Sallam ................ G06F 21/552 726/23 |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1* | 11/2014 | Cunningham ........ G06F 21/554 726/22 |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0370723 A1* | 12/2015 | Nambiar ............... G06F 12/121 711/159 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0072810 A1* | 3/2016 | Sarkar ................... H04L 63/083 726/5 |
| 2016/0078225 A1 | 3/2016 | Ray et al. |
| 2016/0080399 A1* | 3/2016 | Harris ................. H04L 63/1433 726/23 |
| 2016/0080417 A1* | 3/2016 | Thomas ............... H04L 63/1416 726/1 |
| 2016/0080418 A1 | 3/2016 | Ray et al. |
| 2016/0080419 A1* | 3/2016 | Schiappa ............. H04L 63/1441 726/1 |
| 2016/0080420 A1* | 3/2016 | Ray ..................... H04L 63/1408 726/1 |
| 2016/0127393 A1 | 5/2016 | Aziz et al. |
| 2016/0191465 A1 | 6/2016 | Thomas et al. |
| 2016/0191476 A1* | 6/2016 | Schütz ................. H04L 9/0891 713/165 |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0308898 A1* | 10/2016 | Teeple ................ H04L 63/1441 |
| 2016/0335110 A1 | 11/2016 | Paithane et al. |
| 2016/0352750 A1* | 12/2016 | Dotan .................... H04L 67/01 |
| 2016/0381121 A1* | 12/2016 | Costantino ............ G06F 16/245 709/219 |
| 2017/0075877 A1* | 3/2017 | Lepeltier ................ G06F 40/117 |
| 2017/0083703 A1 | 3/2017 | Abbasi et al. |
| 2017/0147657 A1* | 5/2017 | Bhave ................... G06F 16/245 |
| 2017/0171231 A1 | 6/2017 | Reybok, Jr. et al. |
| 2017/0180396 A1* | 6/2017 | Finnig ................. H04L 63/1408 |
| 2017/0237760 A1 | 8/2017 | Holeman et al. |
| 2017/0244714 A1* | 8/2017 | Nam ...................... G06F 21/55 |
| 2017/0244754 A1 | 8/2017 | Kinder et al. |
| 2017/0289191 A1* | 10/2017 | Thioux ................ H04L 63/1441 |
| 2017/0322959 A1* | 11/2017 | Tidwell .................. G06F 17/40 |
| 2017/0339178 A1* | 11/2017 | Mahaffey .............. H04L 41/142 |
| 2018/0013770 A1 | 1/2018 | Ismael |

(56) References Cited

U.S. PATENT DOCUMENTS

| | | |
|---|---|---|
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2018/0365428 A1 | 12/2018 | Edwards et al. |
| 2019/0073224 A1 | 3/2019 | Tian et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Mining Specification of Malicious Behavior"—Jha et al., UCSB, Sep. 2007 https://www.cs.ucsb.edu/.about.chris/research/doc/esec07.sub.--mining.pdf-.

"Network Security: NetDetector-Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xp/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag-An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, Doi: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., "Analyzing and exploiting network behaviors of malware.", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

(56) References Cited

OTHER PUBLICATIONS

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.-- N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Placek, and Timothy N. Newsham, "Insertion, Evasion, and Denial of Service: Eluding Network Intrusion Detection", Secure Networks, ("Ptacek"), (Jan. 1998).
U.S. Appl. No. 15/803,669, filed Nov. 3, 2017 Non-Final Office Action dated Oct. 31, 2019.
U.S. Appl. No. 15/803,669, filed Nov. 3, 2017 Notice of Allowance dated May 19, 2020.
U.S. Appl. No. 16/043,004, filed Jul. 23, 2018 Non-Final Office Action dated Jul. 3, 2019.
U.S. Appl. No. 16/043,004, filed Jul. 23, 2018 Notice of Allowance dated Dec. 30, 2019.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

ENTERPRISE SEARCH

CROSS-REFERENCE TO RELATED APPLICATIONS

This application is a continuation of U.S. patent application Ser. No. 15/803,669 filed Nov. 3, 2017, now U.S. patent Ser. No. 10/795,991 issued Oct. 6, 2020 which claims the benefit of priority on U.S. Provisional Application No. 62/419,422 filed Nov. 8, 2016, the entire contents of which are incorporated by reference.

FIELD

Embodiments of the disclosure relate to the field of cybersecurity, and more specifically, to a method, system, and apparatus for conducting an audit or search of operational attributes of network devices including, in some embodiments, automatically hunting for indicators of compromise.

GENERAL BACKGROUND

Over the last decade, cybersecurity attacks have become a pervasive problem for internet users as many endpoint devices (such as laptops, tablet computers, desktops, servers, and industrial or residential controllers) and other resources have been subject to attack and compromised. In addition, the number of endpoint devices that connect to a single network has grown at a rapid rate due to the prevalence of mobile devices. Thus, it has become difficult for network administrators, network security and forensics analysts, and the like ("administrators") to detect malicious activity on the network, maintain knowledge of the status of downloads and installs of a particular software type, version, or patch, and/or track receipt of a particular malicious email or webpage. Similarly, it has become difficult for a network administrator to determine whether one or more endpoint devices have downloaded a particular file (e.g., an executable file) or have received a document that is known to be associated with malware.

In one particular illustrative example, with the number of mobile devices that routinely connect to, and disconnect from, a network, e.g., an enterprise local area network (LAN), the task of knowing which endpoint devices have downloaded and installed a latest software patch, e.g., to protect against known malware, is not easy due to how frequently files and software are exchanged over the LAN and/or the internet. Thus, providing a system that enables an administrator to determine, inter alia, the current status of a download and/or installation of a software patch, the percentage of endpoint devices connected to the network that have received a particular email known to be malicious, the percentage of endpoint devices that have downloaded a particular version of a web browser known to have a vulnerability, etc., is desired.

However, current analysis systems require an administrator to manually associate and situationally interpret disparate information received from diverse data sources, which may include numerous endpoint devices each having a variety of software and/or hardware configurations. In particular, data obtained from the diverse set of endpoint devices may overwhelm an administrator based on the diversity and amount of data obtained. This problem of receiving an overwhelming amount of data that may be expressed in a plurality of forms and formats may be exacerbated in large enterprise networks. Therefore, operational realities of the endpoint devices indicated by the data, both expected and unexpected, may not be determinable or readily understood by an administrator based on current analysis systems. Thus, detection of vulnerabilities within the network (e.g., associated with a particular endpoint device), the presence of known malware, the status of downloads/installs of software types, versions and patches, etc., may be hindered and delay efforts to ensure the network is protected from malware attacks and/or to remediate malware attacks.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
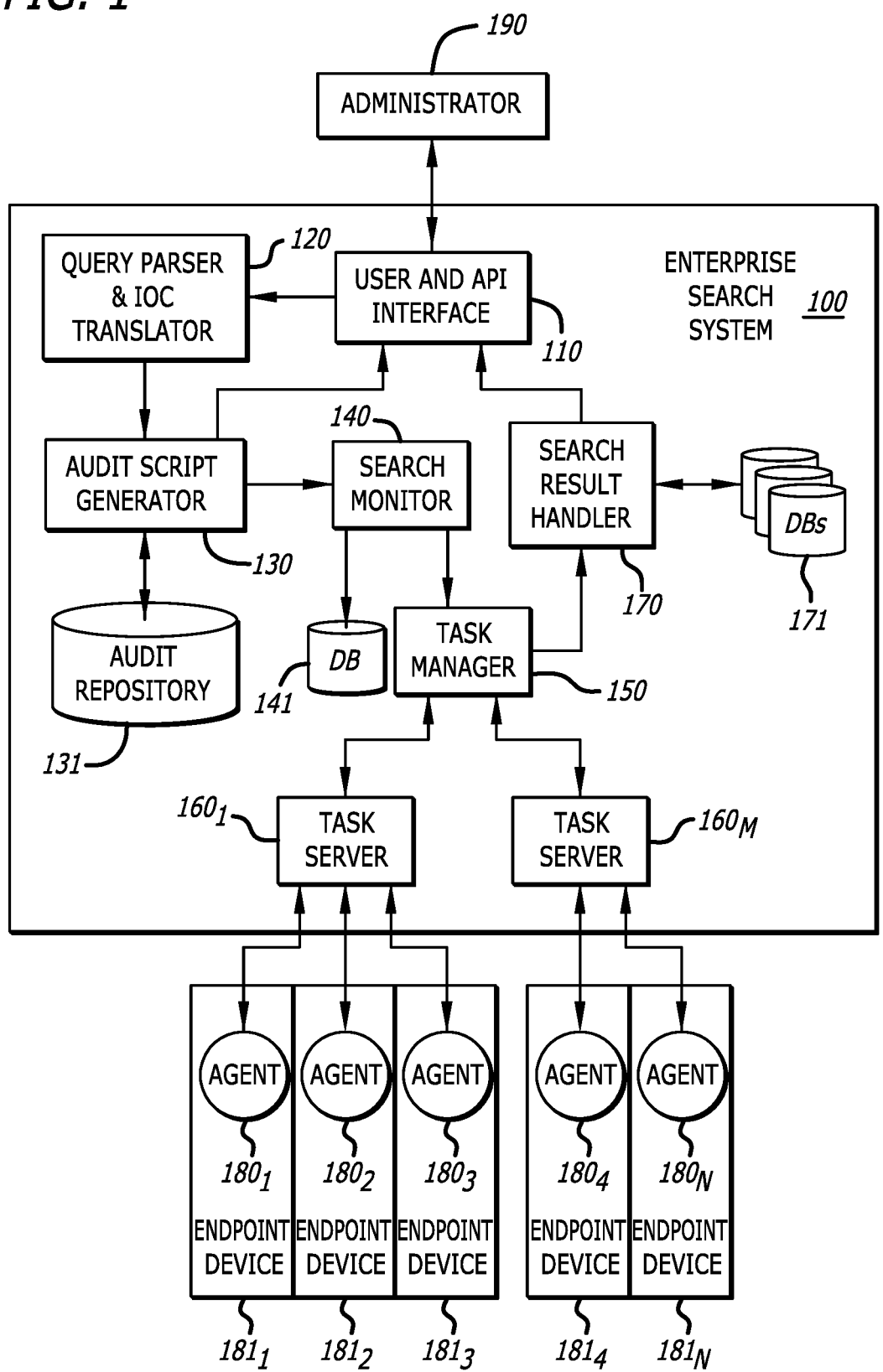
FIG. 1 is an exemplary block diagram of logic components comprising an enterprise search system 100 in accordance with an embodiment of the invention.

Various embodiments of the disclosure relate to an enterprise search system and method implemented for use with one or more network devices (e.g., endpoint devices), e.g., connected via a computer network, for performing an automated, computerized search or audit for select operational attributes of any or all of the network devices. The operational attributes may include, for example, properties, characteristics, parameters, indicators, artifacts, data, etc. Embodiments of the invention provide flexible query and proactive endpoint inspection capabilities, employing a scalable approach to perform the audit across potentially hundreds or even thousands of endpoint devices.

In some embodiments, an administrator initiates the search by providing input information at an enterprise search system. The enterprise search system uses the input information to form a query of preselected form and format, and to determine one or more suitable audits (i.e., each specifying one or more tasks) to run on the endpoint devices. The enterprise search system makes the audits available to the endpoint devices, and receives back responses to the query. The audits may be transmitted to the endpoint devices or uploaded to a database for retrieval by the endpoint devices.

In some embodiments, the enterprise search system makes the audit determination by identifying one or more audits from a library of pre-established and stored (canned) audits, and by generating filter conditions to apply to the audit results. The pre-established audits may be designed to search for data of a generic type or category (e.g., browser history), which may contain information (e.g., uniform resource locators (URLs)) in addition to the specific data of interest (e.g., a specific URL). Accordingly, the search results may be subsequently filtered to yield the specific data of interest.

In some embodiments, the audits to be run are identified based on attributes included in the query, and filter conditions are generated based on one or more sub-attributes which may also be included in or otherwise associated with the query. In running the audit, the endpoint device executes the tasks (e.g., scripts) of the audit to yield audit results. Then, the endpoint applies the filter conditions to yield filtered results responsive to the query and provides the response to the enterprise search system. Alternatively, in some embodiments, the audit results from the endpoint devices may be provided (unfiltered) as the query response to the enterprise search system, which applies the filter conditions to yield, for each or sets of reporting endpoint, the filtered results.

In some embodiments, the enterprise search system identifies a set of one or more audits based on the attributes included in the query, and provides the set to the endpoint devices. Each of the potentially disparate endpoint devices targeted for audit within the computer network is provided one or more of the audits to run, based on factors such as, for example, the type of endpoint device and/or its compute platform (e.g., operating system). More specifically, according to embodiments of the invention, the endpoint devices each include an agent (e.g., an executable computer program) to receive and execute the tasks of the audit(s), apply the filter conditions and return the results. In some embodiments, one or more audits corresponding to the input information are broadcast to one or more endpoint devices such that each agent selects from among the audits provided by the enterprise search system those that are appropriate to the configuration of its corresponding endpoint device in which it is resident. For example, the audits may include a first set of audits adapted for particular types of endpoints (e.g., laptops or smart phones), or for particular types compute platforms of the same type of endpoints, including hardware and/or software configurations such as operating systems (e.g., Windows® or Apple® operating system). The tasks of each audit may be executed with respect to data stored on the endpoint device. For this, the agent may access logs, memory and other data stores accessible in or by the endpoint device. The agent is adapted to inspect, monitor and acquire data, which collectively are called "discovery." The discovery may be performed with respect to, for example, software (types, versions, patch level, configuration), vulnerabilities, network activity history (e.g., browser history), email history, processing activity, etc. In some embodiments, the agent will perform the audits with respect to previous conducted processing activity and previously stored data on the endpoint device. In other embodiments, or for other audits, the agent may perform discovery prospectively by continuing to inspect, monitor and acquire responsive data over a subsequent period of time, which may be of configurable length. In other words, in executing the tasks, the agent may collect already existing data, e.g., with respect to current state or status of the endpoint at an initial time, and/or may collect data reflecting subsequent state and status of the endpoint from time to time after the initial time. The collected data may be sent promptly after being collected, and subsequently updated by the agent as further data is collected, or may be aggregated prior to transmission to the enterprise search system.

Aspects of the invention find application in conducting a cyber-threat investigation, such as a cyber-attack incidence response or an in-depth forensic investigation to ascertain whether or not a network or its endpoint devices have been compromised. Other applications exist as well, ones that do not necessarily involve a cyber-threat investigation, but instead, for example, provide analytics to an administrator regarding the status and configuration of the network and endpoint devices connected thereto. With respect to applications involving a cyber-threat investigation, security analysts would seek to identify indicators of compromise ("IOCs"). Indicators of compromise in computer forensics are artifacts observed on a network, for example, in one or more endpoint devices, that indicate the presence of a cyber-attack with a high level of confidence. The artifacts may include operational attributes that singularly or together (e.g., in a pattern) evidence the attack. Based on the indicators of compromise, the security analysts can not only determine whether a cyber-attack has taken place, but can often trace the attack to its first victim within the network, identify the malicious source and/or goal of the attack, assess damage caused by the attack, and develop strategies for attack remediation and future attack prevention. Previously, in performing the investigation, security analysts would have to manually associate and situationally interpret disparate information obtained from diverse data sources, including numerous network endpoint devices having a variety hardware and software configurations. The security analysts are often challenged and even sometimes overwhelmed by the large amount of data collected from endpoint devices when performing the investigation in large enterprise networks (which should be understood, for purposes hereof, to include governmental networks). Additionally, by the time security analysists were able to manually associate and situationally interpret the disparate information, a cyber-attack may have further damaged the network or one or more endpoint devices (e.g., installed malware, obtained sensitive information, etc.) and/or the configuration of one or more endpoint devices connected to the network may have been altered, thus making the data being analyzed by the security analysists outdated. Past approaches have attempted to deal with this challenge by narrowing the potential IOCs monitored and analyzed, which unfortunately limits the security analysts' view of a potentially compromised network and may lead to false or incomplete conclusions. In one application, the inventive concept provides tools for automating the cyber-attack investigation to hunt for indicators of compromise across networks.

For such purposes, the enterprise search system in accordance with an embodiment of the invention receives input information, for example, from a security analyst (serving as the administrator), which may relate to known or suspected indicators of compromise. The security analyst may enter the input information via a graphical user interface (GUI) provided by the enterprise search system, e.g., a computer program running on a network device. The enterprise search system generates one or more indicators of compromise (IOC) (i.e., data in a specific format related to or constituting one or more operational attributes) based on the input information, generates the search query based on or containing the input information, and selects one or more audit scripts that correspond to components of the input information and thus to the search query. These audit scripts are provided over a network to one or more endpoint devices.

The endpoint devices each include a resident agent to perform the search by executing the audit scripts to collect responsive data from sources within or accessible by the endpoint device. In some embodiments, one or more filters based on the components of the input information are provided to the endpoint devices along with the audit scripts. In embodiments of the invention, the IOC's may include operational attributes used to determine the audit scripts and perform filtering and sub-attributes used to perform filtering at a higher granularity than with operational attributes. For example, where the search query includes operational attributes seeking information regarding websites visited by the endpoints, the audits selected may collect browser history (i.e., a list of previously visited websites), associated sub-attributes used for filtering may each indicate a prescribed URL (for example, www.badmalware.com), which, if found in the browser history, should be included in the response to the search query. The enterprise search system receives the filtered or "final" results from the agents, which together represent a response to the security analyst's search query. Notably, the IOCs reflect the input information, which serves as the search query, and assure that the response is of interest to the security analyst and thus relevant to the security analyst's purpose in conducting the search. In some embodiments, the filtering may be performed by the enterprise search system rather than by the endpoint devices, and, in some embodiments, the IOC's may be used to customize audit scripts designed with configurable settings, parameter and/or other programmatic devices, so as to obtain the response directly, rather than (or in addition to) being used for filtering of audit results.

In more detail, embodiments of the enterprise search system relate to determining one or more audits (e.g., queries, searches, analyses to be performed by an endpoint device, etc.) that correspond to the received input information. Subsequent to the determination of the one or more audits, one or more audit scripts may be generated, for example, according to specific operating systems configurations of endpoint devices. In addition, embodiments may relate to providing the audit scripts to the endpoint devices, wherein an audit script may be directed to a specific endpoint device and downloaded by said endpoint device. Embodiments may also relate to receiving results from one or more endpoint devices subsequent to execution of the one or more audits included within the downloaded audit script. Further, embodiments of the enterprise search system may relate to sorting and displaying the results received from one or more endpoint devices. More specifically, an embodiment of an enterprise search system may employ the following technique: first, receive input information via an interface, e.g., via a query bar. Second, logic of the enterprise search system parses the received input information and generates an indicator of compromise according to the received input information. Third, the logic of the enterprise search system determines one or more audits that correspond to the indicator of compromise. Fourth, an audit script is generated by logic of the enterprise search system according to a specific operating system configuration of an endpoint device wherein the audit script includes at least the indicator of compromise and one or more audits applicable to the specified operating system. Fifth, the logic of the enterprise search system provides the audit script to a targeted endpoint device. Sixth, following execution of the one or more audits comprising the audit script by the target endpoint device, the logic of the enterprise search system receives results of the audits filtered by the agent installed on the endpoint device according to the indicator of compromise, wherein the indicator of compromise is also provided to the target endpoint device. The received results may be aggregated with results received from additional endpoint devices executing the same, or a similar, set of audits and rendered for display on a display screen of the network device of the administrator.

While specific embodiments are described herein, the invention is not to be limited to these embodiments, the invention is to be understood as not limited by the specific embodiments described herein, but only by scope of the appended claims. Features and details from one or more described embodiments may also be combined, added or removed to form other embodiments within the scope of the invention, as the described embodiments are merely exemplary of various features.

I. Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "computerized" generally represents that any corresponding operations are conducted by hardware in combination with software and/or firmware.

The term "indicator of compromise" should be interpreted as a descriptor of one or more technical characteristics or other operational attributes of a network and/or an endpoint device that are potentially associated with a cyber threat or attack, a cyber-attacker's methodology, or other evidence of compromise of a network and/or an endpoint device, based on experiential knowledge of known cyber threats and attacks, methodologies, and compromises. For example, an indicator of compromise may be a descriptor used to identify a particular known malware or its behavior on a network and/or an endpoint device. Alternatively, or in addition, an indicator of compromise may be a descriptor of a non-malicious characteristic of a network and/or an endpoint device, which may be useful in determining the likelihood of a cyber threat, attack, or compromise. For example, an indicator of compromise may be a descriptor used to identify a status of a download and/or install of a particular software type, version or patch on one or more endpoint devices (e.g., the percentage of the endpoint devices connected to a network that have downloaded and/or installed the particular software patch), which information may be useful, for example, to determine the existence within the network or endpoint device of software vulnerabilities and/or likelihood of exploits. As used herein, an indicator of compromise acts as a filter of data returned as a result of execution of one or more audits, wherein the filtering using the indicator of compromise may performed by an agent located on an endpoint device and/or the enterprise search system.

The term "message" generally refers to information in a prescribed format and transmitted in accordance with a suitable delivery protocol such as Hypertext Transfer Protocol (HTTP), HTTP Secure (HTTPS), Simple Mail Transfer Protocol (SMTP), iMessage, Post Office Protocol (POP), Instant Message Access Protocol (IMAP), or the like. Hence, each message may be in the form of one or more packets, frames, or any other series of bits having the prescribed format. Messages may correspond to HTTP data transmissions, email messages, text messages, or the like.

According to one embodiment, the term "malware" may be construed broadly as any code or activity (e.g., a tool) that initiates a malicious attack and/or operations associated with anomalous or unwanted behavior. For instance, malware may correspond to a type of malicious computer code that executes an exploit to take advantage of a vulnerability, for example, to harm or co-opt operation of an endpoint device or misappropriate, modify or delete data. In the alternative, malware may correspond to an exploit, namely information (e.g., executable code, data, command(s), etc.) that attempts to take advantage of a vulnerability in software to cause an endpoint device or other portions of a network to experience undesirable or anomalous behaviors. The undesirable or anomalous behaviors may include a communication-based anomaly or an execution-based anomaly, which, for example, could (1) alter the functionality of an endpoint device so as to operate in an atypical manner (for example, a file is opened by a first process where the file is configured to be opened by a second process and not the first process) with or without any apparent malicious intent; and/or (2) provide unwanted functionality which may be generally acceptable in another context. In yet another alternative, malware may correspond to information that pertains to the unwanted behavior such as a process that causes data such as a contact list from an endpoint device (e.g., a mobile phone) to be uploaded by a network to an external storage device without receiving permission from the user.

In certain instances, the terms "compare," "comparing," "comparison," or other tenses thereof generally mean determining if a match (e.g., a certain level of correlation) is achieved between two items where one of the items may include a particular pattern.

The term "process" may include an instance of a computer program (e.g., a collection of instructions, also referred to herein as an application). In one embodiment, the process may be comprised of one or more threads executing concurrently (e.g., each thread may be executing the same or a different instruction concurrently).

The term "processing" may include execution of a binary or launching an application wherein launching should be interpreted as placing the application in an open state and, in some implementations, performing simulations of actions typical of human interactions with the application. For example, the application, an internet browsing application, may be processed such that the application is opened and actions such as visiting a website, scrolling the website page, and activating a link from the website are performed (e.g., the performance of simulated human interactions).

The term "object" generally relates to content having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. The object may be retrieved from information in transit (e.g., a plurality of packets) or information at rest (e.g., data bytes from a storage medium). Examples of different types of objects may include a data element, one or more flows, or a data element within a flow itself.

The term "network device" should be construed as any electronic device with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, standalone appliance, a router or other intermediary communication device, etc. Other examples of a network device include a computing node, namely hardware and/or software that operates to receive information, and when applicable, perform malware analysis on that information. The term "endpoint device" as used herein should be construed to be any network device that is communicatively coupled to the enterprise search system via the network. For purposes of clarity, an electronic device of an administrator will be referred to as a network device while other electronic devices communicatively coupled to the enterprise search system will be referred to as endpoint devices, though all such endpoint devices constitute network devices.

The term "transmission medium" may be construed as a physical or logical communication path between two or more electronic devices (e.g., any devices with data processing and network connectivity such as, for example, a sensor, a computing node, mainframe, a computer such as a desktop or laptop, netbook, tablet, firewall, smart phone, router, switch, bridge, etc.) or between components within an electronic device. For instance, as a physical communication path, wired and/or wireless interconnects in the form of electrical wiring, optical fiber, cable, bus trace, or a wireless channel using infrared, radio frequency (RF), may be used.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Enterprise Search System

1. Architecture

Referring to FIG. 1, an exemplary block diagram of logic components comprising an enterprise search system 100 is shown connected to (i) an administrator 190 and (ii) a plurality of agents $180_1$-$180_N$ each installed within a respective endpoint device $181_1$-$181_N$. The enterprise search system 100 is shown to include: (i) a user and application programming interface (API) interface logic 110; (ii) a query parser and indicator of compromise (IOC) translator logic 120; (iii) an audit script generator logic 130; (iv) a search monitor logic 140; (v) a non-transitory storage medium 141; (vi) a task manager logic 150; (vii) one or more task servers $160_1$-$160_M$ (wherein M≥1); (viii) a search results handler 170; and (ix) one or more non-transitory storage mediums 171, which may be included within the non-transitory storage medium 141. The enterprise search system 100 is shown to be communicatively coupled to (i) the administrator 190 and (ii) one or more agents $180_1$-$180_N$ (N≥1), wherein each of the agents $180_1$-$180_N$ is installed on a separate endpoint device remote from the enterprise search system 100.

As discussed above, the enterprise search system 100 receives input information from a network administrator, network security and forensics analyst, or the like ("the administrator 190") that constitutes a search query. By providing the input information, the administrator 190 has the purpose of obtaining data of interest from one or more endpoint devices communicatively coupled to the enterprise search system 100, wherein the data is responsive to the search query. As one example, the search query may include "File name is evil.exe" and the enterprise search system 100 may be configured to generate a task, comprised of one or more audits to be executed by one or more of the agents $180_1$-$180_N$ each installed on separate endpoint devices to search for a file by that name on the respective endpoint device. The enterprise search system 100 subsequently receives results from one or more of the agents $180_1$-$180_N$ based on execution of the audits and displays the results on a display screen of network device of the administrator 190.

More specifically, the user and API interface logic 110 of the enterprise search system 100 receives input information from the administrator 190 (e.g., via a network device) or, alternatively, in the form of an HTTP request received by the enterprise search system via API access. The input information may be via any conventional input method, with an example being illustrated in FIG. 4. Embodiments may include the user and API interface logic 110 configured to receive input via any various input methods, which may include graphical user interface (GUI) input methods and/or using one or more APIs. Examples of GUI input methods may include, but are not limited or restricted to, text boxes, radio dials, drop down menus, button inputs, etc. In one embodiment, API access may be achieved through a set of RESTful web services (where RESTful corresponds to representational state transfer), available to any program or script over a stateless communication protocol, such as HTTP. Once authenticated, an administrator can trigger an enterprise search by simply creating a HTTP request, and passing one or more expected parameters.

In one embodiment, the enterprise search system 100 may be configured to accept the input information (e.g., via a query bar) in the form of one or more "tokens," wherein a token may include (i) a field component, (ii) an operator component, and (iii) a value component.

Figure 4:
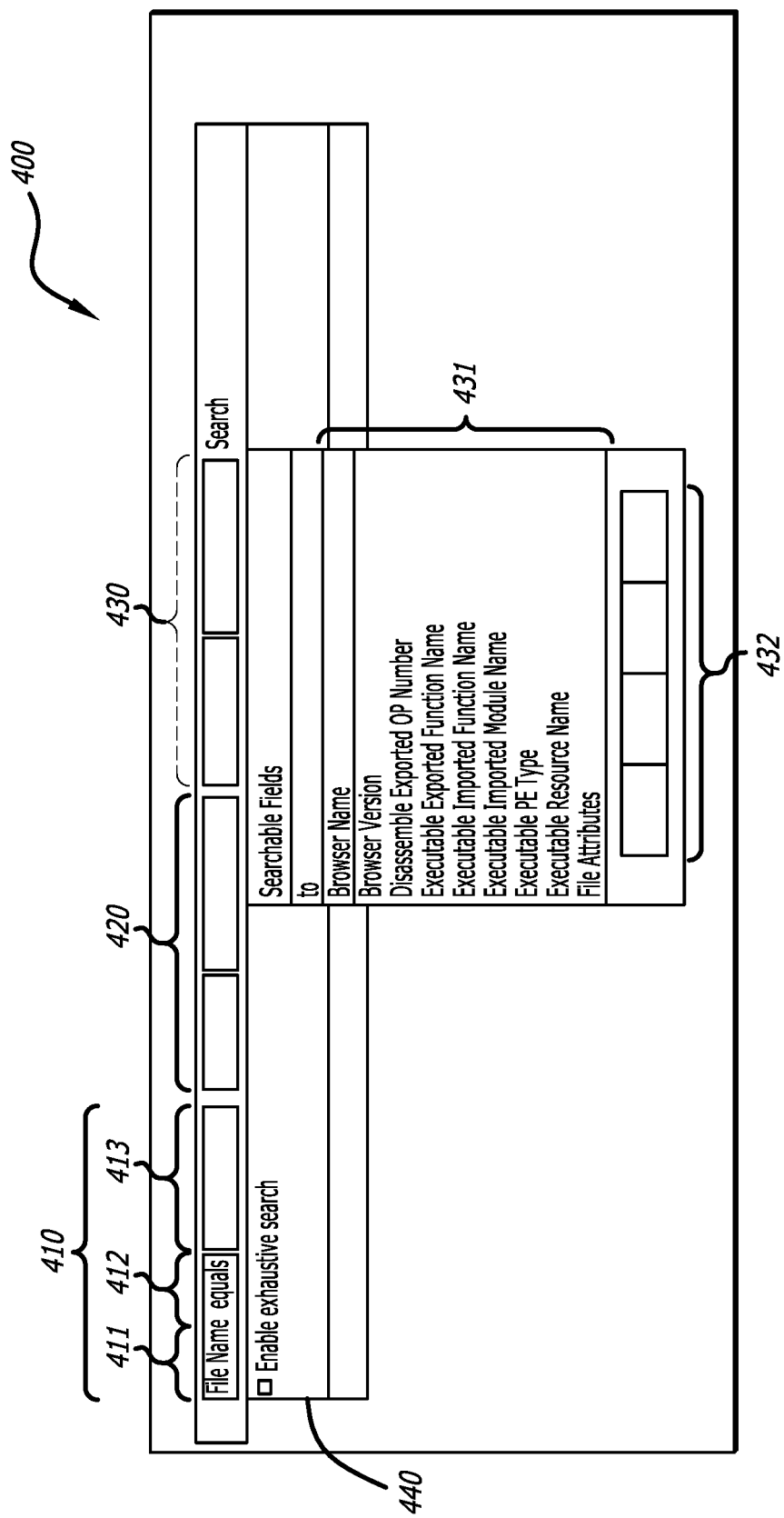
FIG. 4 is an exemplary illustration of input information being received by a query bar of the enterprise search system 100 of FIG. 1.

In one example illustrated in FIG. 4, the administrator 190 may input a search term (referred to herein as the value component), such as "file_name.exe" for which that the administrator 190 wants to search on one or more endpoint devices. The query parser and IOC translator logic 120 may parse the input information (e.g., "file_name.exe") to determine whether the input information is representative of a file name. Upon such a determination, the query parser and IOC translator logic 120 may recommend to the administrator 190 a field component of "File Name" and an operator component of "equals," forming a token of "File Name equals file_name.exe." The suggestions may be altered by the administrator 190, e.g., by changing the operator (for example, changing "equals" to "includes," or an alternative operator). Thus, the enterprise search system 100 simplifies the process of input entry by the administrator 190 by assisting the administrator 190 in selecting components to form a token and allowing the administrator 190 to enter a basic search term (e.g., a file name) instead of a full phrase.

Furthermore, as will be discussed below, query parser and IOC translation logic 120 within the enterprise search system 100 parses the received input information, generates an IOC and, based on the IOC, generates an audit script that is to be provided to (via one of a push or pull method) one or more endpoint devices, wherein the audit script contains one or more audits to be executed by the one or more endpoint devices. In some embodiments, the query parser and IOC translation logic 120 generates a plurality of audits, each corresponding to an audit script to be executed by one or more endpoint devices.

Based on the input information, the enterprise search system 100 generates an IOC in a specific format related to or constituting one or more operational attributes and sub-attributes. More specifically, in some embodiments, upon receipt of input information including one or more tokens, the query parser and IOC translator logic 120 parses the one or more tokens into its components to determine a set of unique token field components (e.g., a characteristic of an endpoint device or of an object associated with the endpoint device). Examples of field components may include, but are not limited or restricted to, "File Name," which provides an identifier for a file; "Full Path Name," which provides the full path to a file; "Browser Name," which provides the name of a browser application; "File MD5 Hash," which provides an identifier for a file in the form of an MD5 hash of all or a portion of a file; "Username," which provides the name of a user; "Timestamp—Created," which provides the creation time of a file; "Timestamp—Modified," which provides the time of the last modification of a file; "Size in bytes," which provides the size in bytes of a file; etc.

In some embodiments, the operational attributes are implemented as "itemTypes" and the sub-attributes as "itemTypeFields." More specifically, each token field component corresponds to two listings: (1) a list of "itemTypes," and (2) a list of "itemTypeFields." An itemType is a list of itemTypeFields, and corresponds to an operational attribute of interest to the administrator. An itemTypeField is a sub-attribute corresponding to one of the itemTypes. A combination of an itemType, a corresponding itemTypeField, and one or more components of the input information are converted into a "condition" (also referred to herein as an "IOC condition"), wherein the condition is employed in filtering the results of an executed audit script. Conditions will be discussed below. The filtering produces a subset of the results of the execution of the audits returned to the enterprise search system 100 tailored according to the input information.

The query parser and IOC translator logic 120 determines a list of "itemTypes" that corresponds to each respective token field component included in the input information. The query parser and IOC translator logic 120 then determines a subset of itemTypes that are applicable to all token field components by performing a mathematical intersection of the lists of itemTypes corresponding to each token field component.

Embodiments of the invention provide various types of searches. In one embodiment, the administrator 190 may select a "quick search" or an "exhaustive search." A quick search may be more particularized and encompass fewer searches and/or analyses, and correlate to a smaller dataset (i.e., amount of data to be search on the endpoint device during execution of the audit than the exhaustive search. Additionally, the selection of quick search or exhaustive search may limit the itemTypeFields and/or the itemTypes that may be selected by the query parser and IOC translator logic 120 within the enterprise search system 100. For example, when quick search is selected (e.g., by default), the field component may correspond to a first set of itemType-Fields and a first set of itemTypes. However, when exhaustive search is selected, the field component may correspond to a second set of itemTypeFields and a second set of itemTypes. Moreover, in some embodiments, audits that are known to be slow or computationally expensive (e.g., typically take longer than a predetermined time to complete, or using at least a threshold of processing power available for execution) are only performed by the enterprise search system 100 when an exhaustive search is selected by the administrator.

Moreover, some embodiments geared toward conducting enterprise searches on diverse types of endpoint devices provide specific audit scripts for each of the different configurations of endpoint devices. For example, laptop computers may be implemented on a Windows® platform while others on an Apple® operating system platform, and accordingly the enterprise search system 100 provides corresponding audit scripts to run on the agents resident on the respective endpoint devices. Accordingly, a third set of itemTypeFields and a third set of itemTypes may be applicable to a first operating system and a fourth set of itemTypeFields and a fourth set of itemTypes may be applicable to a second operating system. Thus, the selection of subsets of itemTypeFields and itemTypes corresponding to one or more token field components may be performed for multiple operating systems.

IOCs (e.g., filters) and IOC conditions (e.g., filter conditions) will now be described with respect to an illustrative embodiment of the invention. Based on at least the list of item TypeFields, the subset of item Types and the tokens received as input information, the query parser and IOC translator logic 120 generates an IOC including one or more IOC conditions. An IOC condition is generated for each unique pairing of an itemType with an itemTypeField (that is, {token field component, itemType, and itemTypeField included within the itemType wherein the itemTypeField corresponds to the token field component}). Each IOC condition includes an itemType, an itemTypeField, a token value component, and a token operator component. The query parser and IOC translator logic 120 may provide the IOC to the audit script generator logic 130 in a format or structure, for example, XML format.

Additionally, as mentioned above, the query parser and IOC translator logic 120 parses the input information (e.g., a basic search term) and may present the administrator 190 with recommended components (e.g., field component and operator component) in order to formulate a token. Such recommended components may be determined by doing a reverse look-up in the list of possible field components once the list of itemTypeFields have been determined for input information currently present within the query bar. More specifically, by doing a reverse look-up using each itemTypeField to determine a set of all field components to which each itemTypeField is associated. Subsequently, by performing a mathematical union of the set of field components associated with the itemTypeFields, the list of recommended field components is generated. By restricting the recommended list of field components to the union of the set of field components associated with the itemTypeFields corresponding to the current input information, the enterprise search system 100 prevents the administrator 190 from entering multiple tokens that will not correspond to an audit (e.g., which would form an invalid IOC). The recommended field components may be displayed in, for example, a drop down menu as illustrated by "field options 431" of FIG. 4.

The audit script generator logic 130 parses the IOC to determine a unique set of itemTypes included within the IOC. The audit script generator logic 130 then determines a list of audits by determining a corresponding audit within the pre-established library of audits for each itemType within the unique set of itemTypes. The pre-established library of audits may be stored in an audit repository 131 as seen in FIG. 1. Subsequently, based on the input information and the selected audits, the audit script generator logic 130 generates an audit script, which includes at least: (i) the IOC, (ii) configuration settings, and (iii) an identification of each audit to execute along with any audit specific parameters, if applicable. The configuration settings within the audit script provide instruction to the endpoint device during execution of the one or more audits (e.g., whether to run the audits in parallel, whether to return a value if no results found, etc.). As discussed above with respect to itemTypeFields and itemTypes, the generation of a list of audits and an audit script may be done per operating system (e.g., possibly resulting in multiple lists of audits and multiple audit scripts to be provided to or retrieved by the endpoint devices). In one embodiment, audit specific parameters may include, inter alia: (i) a specification of the root path, being the starting place of a search; (ii) a maximum folder depth to traverse from the root; (iii) a minimum and/or maximum file size, and/or (iv) a file size range limiting the size of files examined by the search.

Subsequent to generating the audit lists, the audit script generator logic 130 generates one or more tasks to be published (e.g., provided to one or more of the task servers 160$_1$-160$_M$) for retrieval by one or more endpoint devices (or alternatively, provided directly to the endpoint devices). More specifically, a task may be defined as a message that includes (i) an identifier of a target endpoint device, and (ii) the version of the audit list that corresponds to the operating system of the target endpoint device. In one embodiment, at least the audit list may be encrypted. A task may be generated for one or more endpoint devices.

The audit script generator logic 130 may provide the search monitor logic 140 with the one or more tasks and the search monitor logic 140 may store a copy in the storage medium 141. Additionally, the search monitor logic 140 may maintain a status for each search, wherein a search may be defined as the receipt of input information from an administrator 190 or via API, generation of one or more tasks, publication of the one or more tasks until results of execution of audits set forth in the one or more tasks are received by the enterprise search system 100. The search monitor 140 is responsible for determining a list of agents communicatively coupled to the enterprise search system 100 that are to retrieve or receive a task and dispatching tasks for each corresponding endpoint device. For example, the search monitor 140 may perform such responsibilities via the task manager 150 and the task servers $160_1$-$160_M$.

The task manager logic 150 may be supplied with the one or more tasks by the search monitor logic 140. In one embodiment, the task manager logic 150 provides the one or more tasks to the appropriate task server $160_1$-$160_M$. In such an embodiment, as each task is specific to a targeted endpoint device and that targeted endpoint device is communicatively coupled to a task server, each task may be provided only to the relevant task sever. Therefore, when the agent of the target endpoint device polls the task server to which it is communicatively coupled, the agent retrieves the published targeted task. In an alternative embodiment, all tasks may be provided to each task server $160_1$-$160_M$ and broadcast to all endpoint devices, wherein the agent installed on each endpoint device determines which task is targeted for the endpoint device on which the agent is installed.

The search results handler 170 may be provided with filtered results of execution of the one or more audits set forth within each task upon receipt of the filtered results by the enterprise search system 100. More particularly, when one or more audits have been executed on an endpoint device, the agent installed on an endpoint device filters the results of the one or more audits according to the sub-attributes of the IOC included within the task. In particular, each audit may include instructions that return results corresponding to several itemTypeFields wherein the input information received from the administrator 190 or API may only concern a subset of the itemTypeFields. Thus, in order to return particularized results that correspond to the input information received from the administrator 190 or API, the sub-attribute of the IOC is used as a filter such that only results corresponding to the itemTypeFields set forth in the IOC are returned to the enterprise search system 100. Upon receiving the filtered results, the results are provided to the search results handler 170 via the task manager 150. In addition, the search results handler 170 may aggregate the filtered results of the executed audits from one or more endpoint devices for convenience of viewing by the administrator 190. The search results handler 170 may store the filtered results, aggregated or individually, by search, in one or more non-transitory storage mediums 171, which may be included within the non-transitory storage medium 141

2. Logical Representation

Figure 2:
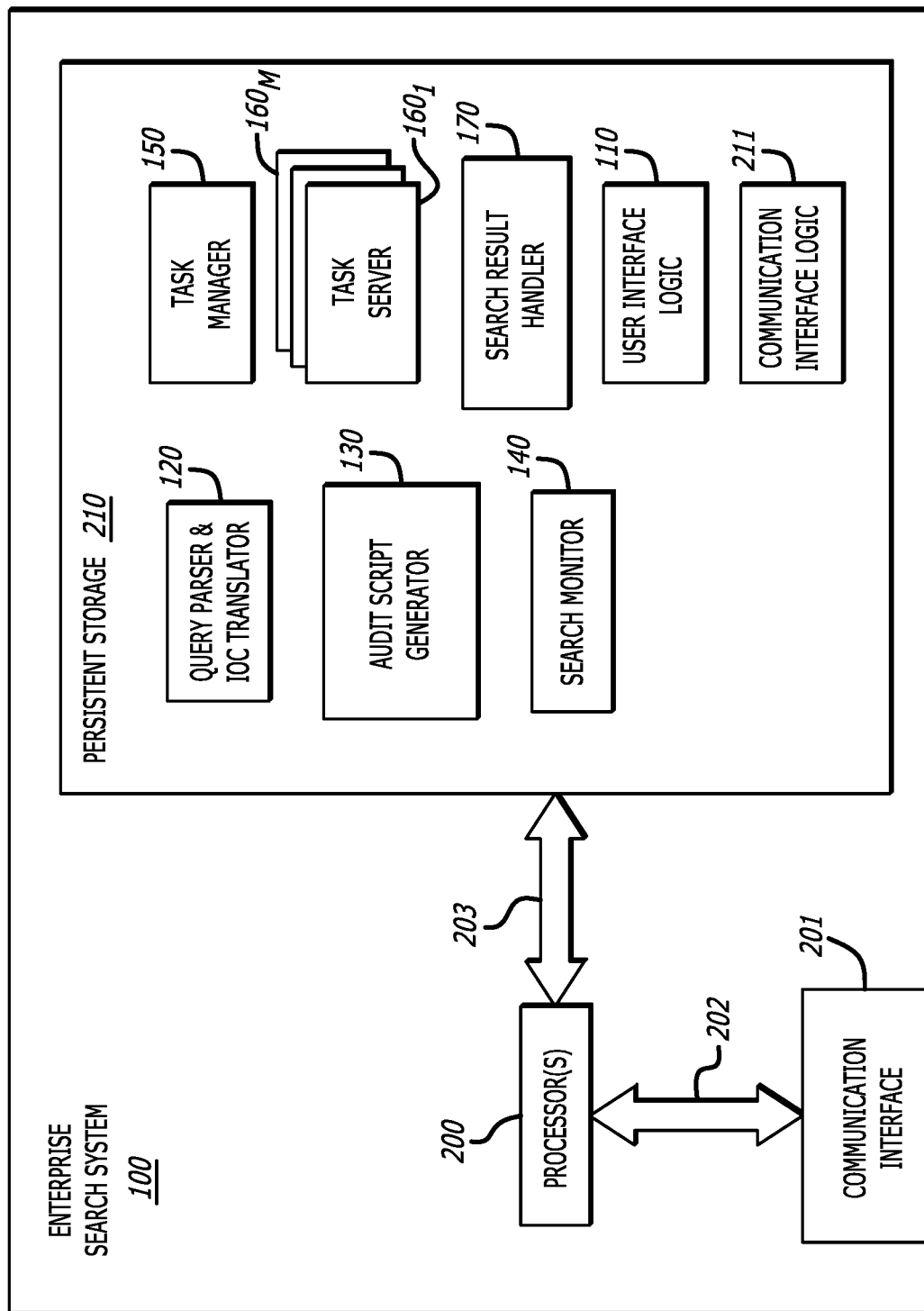
FIG. 2 is an exemplary embodiment of a logical representation of the enterprise search system 100 of FIG. 1.

FIG. 2 is an exemplary embodiment of a logical representation of the enterprise search system 100 of FIG. 1. The enterprise search system 100 includes a housing, which is made entirely or partially of a hardened material (e.g., hardened plastic, metal, glass, composite or any combination thereof) that protects circuitry within the housing, namely one or more processors 200 that are coupled to a communication interface 201 via a first transmission medium 202. The communication interface 201, in combination with communication interface logic 211, enables communications with external network devices, endpoint devices and/or other network appliances to provide endpoint devices with audit scripts and receive filtered results upon execution of the audit scripts. According to one embodiment of the disclosure, the communication interface 201 may be implemented as a physical interface including one or more ports for wired connectors. Additionally, or in the alternative, the communication interface 201 may be implemented with one or more radio units for supporting wireless communications with other electronic devices. The communication interface logic 211 may include logic for performing operations of receiving and transmitting one or more objects via the communication interface 201 to enable communication between the enterprise search system 100, a network device and one or more endpoint devices via a network (e.g., the internet or a LAN) and/or cloud computing services.

The processor(s) 200 is further coupled to persistent storage 210 via a second transmission medium 203. According to one embodiment of the disclosure, the persistent storage 210 may include (a) the query parser and IOC translator 120, (b) the audit script generator 130, (c) the search monitor 140, (d) the task manager 150, (e) one or more task servers $160_1$-$106_M$, (f) the search results handler 170, (g) the user and API interface logic 110, and (h) the communication interface logic 211. Of course, when implemented as hardware, one or more of these logic units could be implemented separately from each other.

III. Enterprise Search Methodology

Figure 3:
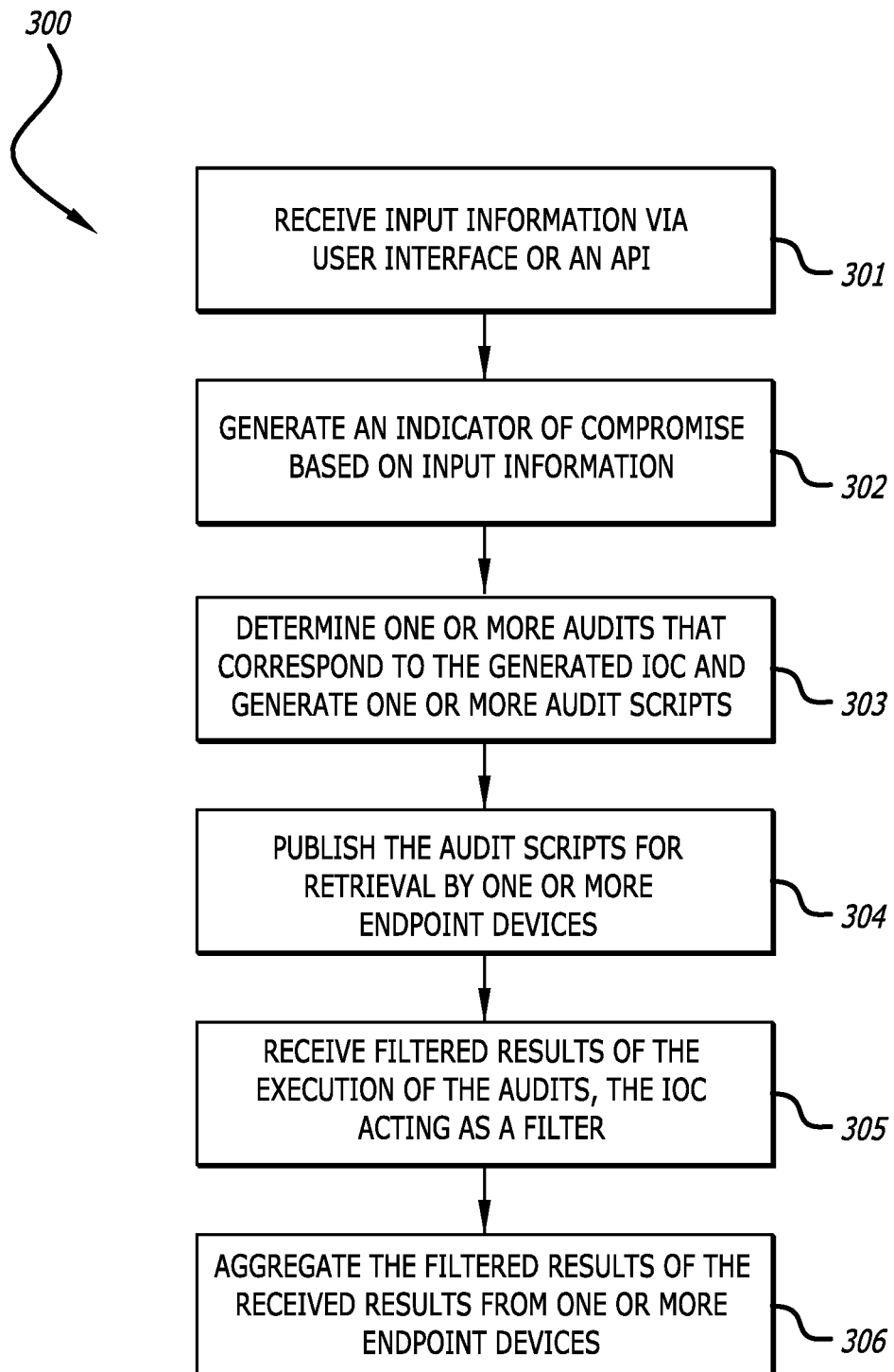
FIG. 3 is a flowchart illustrating an exemplary method for obtaining results of one or more audits based on a generated indicator of compromise corresponding to input information with the enterprise search system 100 of FIG. 1.

FIG. 3 is a flowchart illustrating an exemplary method for obtaining results of one or more audits based on a generated indicator of compromise corresponding to input information with the enterprise search system 100 of FIG. 1. Each block illustrated in FIG. 3 represents an operation performed in the method 300 of receiving input information, parsing the input information in order to generate an IOC, which is used to select one or more corresponding audits wherein the audits are incorporated into one or more audit scripts, which are subsequently published to one or more targeted endpoint devices. Referring to block 301 of FIG. 3, the enterprise search system 100 receives input information via a graphical user interface (GUI). For example, the GUI may take the form of a search query bar that receives a search term via input information. In one embodiment, responsive to input information of the search term to the query bar, logic of the enterprise search system 100 parses the search term and provides one or more suggestions for a search field and an operator that are applicable to the search term. For example, a search term of "sample_name.exe" may be received as input information and parsing may enable logic of the enterprise search system 100 to detect the search term likely (e.g., has a confidence level of at least a predetermined threshold) represents a file name, which results in the logic providing a recommended search filed of "File Name." Additionally, the logic may recommend an operator of "equals," wherein the suggestion results in a token of "File Name equals sample_name.exe," representing an instruction to search for the file name "sample_name.exe." In one embodiment, the input information may include a plurality of tokens.

At block 302, upon receiving input formation via the GUI of the enterprise search system 100, the query parser and IOC translator 110 parses the input information and determines the number of tokens within the input information. Each token is parsed into its respective components: (i) a field component, (ii) an operator component, and (iii) a value component. The query parser and IOC translator 110 determines a set of itemTypes corresponding to each unique field component within the set of tokens. Subsequently, the query parser and IOC translator 120 selects a subset of itemTypes by, for example, performing a mathematical intersection of the lists of itemTypes corresponding to each token. Upon selecting the subset of itemTypes, the query parser and IOC translator 110 generates an IOC. An IOC, as discussed above, includes one or more conditions, wherein a condition is generated for each unique pairing of (i) an itemType, (ii) and an itemTypeField included within the itemType. An IOC condition includes, an itemType, an itemTypeField, a token value component, and a token operator component. The one or more conditions are combined using Boolean operators to form an IOC.

At block 303, the audit script generator logic 130 of the enterprise search system 100 determines one or more audits that correspond to the generated IOC. This determination includes an analysis of the IOC to generate an array of itemTypeFields. Upon the generation of the array of itemTypeFields, one or more lists of audits are generated, wherein each audit may correspond to one or more operating systems. An array of one or more audits is generated by mapping each itemType in the array of itemTypeFields to a corresponding audit, wherein the association of the itemType and the audit are predetermined. Upon generating one or more audit lists (i.e., one list per operating system), the audit script generator logic 130 generates one or more audit scripts (e.g., one per operating system wherein the audit scripts may be the same for one or more operating systems).

At block 304, the enterprise search system 100 publishes the one or more tasks by provided the tasks to the one or more task servers $160_1$-$160_M$. As discussed above, one or more of the agents $180_1$-$180_N$ may retrieve a task generated in accordance with the input information received by the enterprise search system 100 (the agents $180_1$-$180_N$ may periodically poll one of the task servers $180_1$-$180_N$). More specifically, an individual task is directed to a targeted endpoint device, wherein one or more of the agents $180_1$-$180_N$ retrieves a task directed to the agent's corresponding endpoint device. In one embodiment, the endpoint devices that are to receive a task generated in accordance with received input information may be limited, e.g., in accordance with one or more parameters within input information from the administrator 190, to endpoint devices of a specified type, configuration or other aspect. In one embodiment, a task server, e.g., task server $160_1$, publishes a task for a targeted endpoint device by making the presence of the task known to the targeted endpoint device when the targeted endpoint device polls the task server $160_1$. In particular, as discussed above, each task includes a unique identifier associated with the targeted endpoint device (e.g., of the endpoint device itself, of an agent installed on the targeted endpoint device, etc.). The targeted endpoint device may then download the task and execute the corresponding audits set forth therein. In one embodiment, the task server associated with the targeted endpoint device receives the task, as opposed to all task servers receiving all tasks as this reduces the load on the network. Alternatively, all tasks may be provided to all task servers.

In an alternative embodiment, all tasks may be broadcast to all endpoint devices. In such an embodiment, each endpoint device (e.g., the agent installed therein) would determine which task was targeted for the endpoint device.

Referring now to block 305, one or more tasker servers $160_1$-$160_M$ of the enterprise search system 100 receives filtered results from one or more endpoint devices. In particular, each audit included in the audit list within a task may include one or more instructions executable by an endpoint device for analyzing and/or searching data stored on the endpoint device, prior actions taken by the endpoint device, and/or monitoring the status of data stored on the endpoint device or being transmitted/received by the endpoint device. Upon executing the audits, the agent installed on the endpoint device filters the results according to the IOC included within the task. In particular, each audit may include instructions that return results corresponding to several itemTypeFields wherein the input information received from the administrator or API may only concern a subset of the itemTypeFields. Thus, in order to return particularized results that correspond to the input information received from the administrator or API, the sub-attributes of the IOC is used as a filter such that only results corresponding to the itemTypeFields set forth in the sub-attributes are returned to the enterprise search system 100. Upon receiving the filtered results, the results are provided to the search results handler 170 via the task manager 150.

At block 306, search results handler 170 of the enterprise search system 100 aggregates the filtered results of the executed audits from one or more endpoint devices. In one embodiment, the search results handler 170 aggregates the received filtered results to give a collective view of the endpoint devices present on the network.

Referring to FIG. 4, an exemplary illustration of input information being received by a query bar of the enterprise search system 100 of FIG. 1 is shown. As discussed above, the query bar 400 is one example of a GUI input methodology that may be implemented by the enterprise search system 100. In the example illustrated, the query bar 400 is shown to have input information including a token 410 and a token 420. Additionally, the query bar 400 also includes a blank third token 430. As discussed above, input information via a query bar may have the form of a token which includes: (i) a field component, (ii) an operator component, and (iii) a value component. As illustrated, the token 410 includes a field component 411 (e.g., "File Name"), an operator component 412 (e.g., "equals"), and a value component (e.g., "evil.exe"). In one embodiment, the token 410 may be formed when the administrator inputs a search term (e.g., the value component) and logic of the enterprise search system 100 determines the search term likely corresponds to a file name and suggests a field component of "File Name" and an operator of "equals." The administrator may accept these suggestions or select alternative field and/or operator components (e.g., in one embodiment, according to field and/or operator components set forth in respective drop down menus).

The sample input information illustrated in FIG. 4 also includes the token 420, which includes a field component, an operator component and a value component that collective creates the token "File Name equals evil2.exe." Thus, the sample input information of FIG. 4 would correspond to one or more audits that instruct an endpoint device to perform one or more analyses and/or searches and/or monitor the endpoint device for information related to a file name of "evil.exe" and/or a file name of "evil2.exe." In one embodiment, upon entering input information comprising a token, the enterprise search system 100 may display a blank token, e.g., the blank token 430. The enterprise search system 100 may display a drop down menu that enables selection of a field component (e.g., the field options 431 may be labeled "Searchable Fields" for ease of understanding by the administrator). Additionally, one or more options for the operator component of token 430 may be displayed (e.g., the operator options 432). Additionally, the query bar 400 may include the option of selecting to enable the exhaustive search feature as discussed above (e.g., the check box 440).

Figure 5:
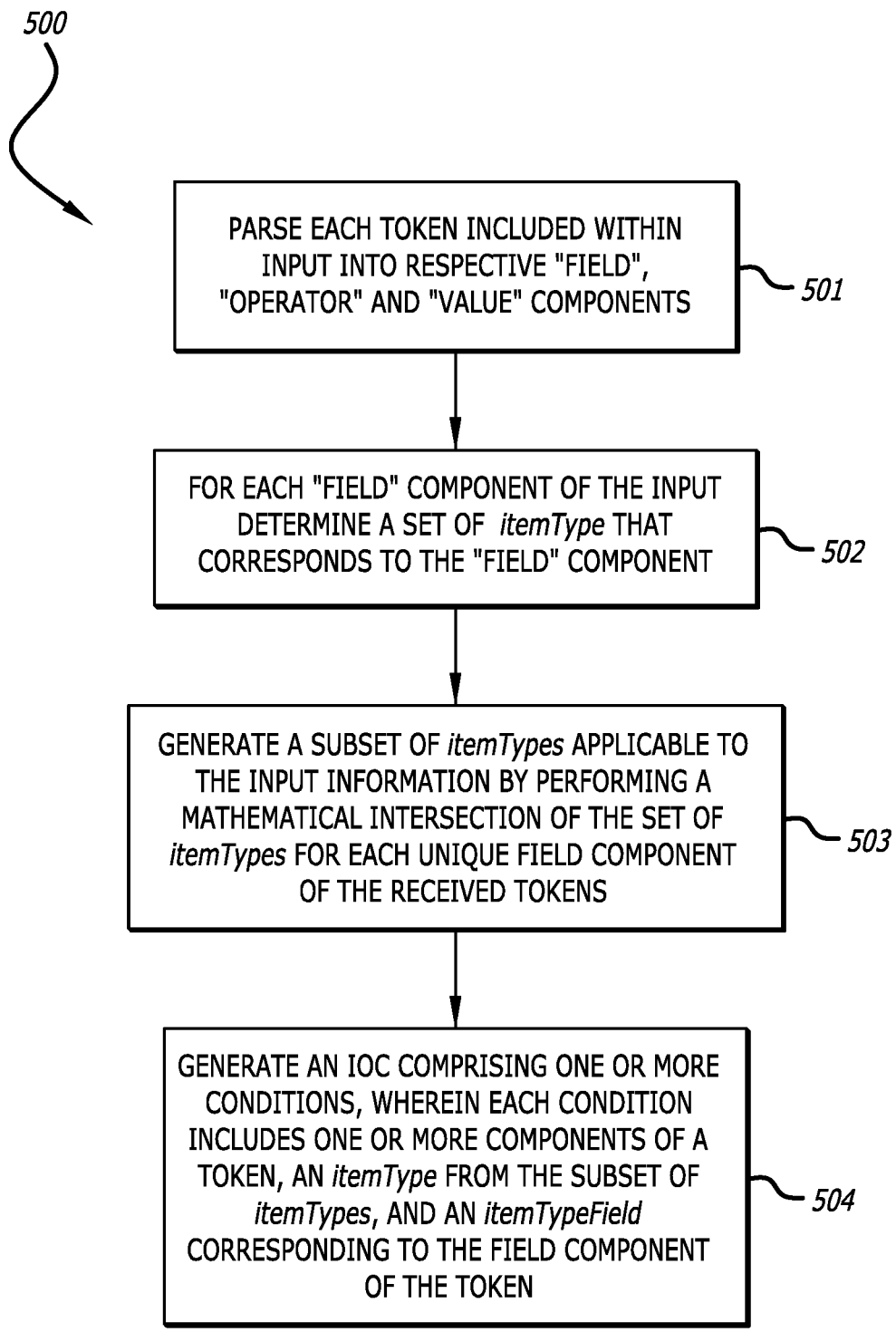
FIG. 5 is a flowchart illustrating an exemplary method for generating an indicator of compromise with the enterprise search system 100 of FIG. 1.

Referring to FIG. 5, a flowchart illustrating an exemplary method for generating an indicator of compromise with the enterprise search system 100 of FIG. 1 is shown. Each block illustrated in FIG. 5 represents an operation performed in the method 500 of generating an IOC with the enterprise search system 100 of FIG. 1. Referring to block 501, the query parser and IOC translator logic 120 of the enterprise search system 100 parses each token included within the received input information into its components ("field," "operator," and "value"). At block 502, for each token field component, the query parser and IOC translator logic 120 determines a set of itemTypes that corresponds to each token field component. Additionally, the query parser and IOC translator logic 120 also determines a set of itemTypeFields, as discussed above, that corresponds to each token field component.

At block 503, the query parser and IOC translator 120 selects a subset of itemTypes by, in one embodiment, performing a mathematical intersection of the lists of itemTypes corresponding to each token. At block 504, the query parser and IOC translator logic 120 generates an IOC that includes one or more conditions wherein each condition includes at least, one or more components of a token (e.g., token_A), an itemType from the subset of itemTypes and an itemType field included within the itemType wherein the itemTypeField corresponds to the field component of token_A. Additionally, in one embodiment, upon generating the IOC, the query parser and IOC translator logic 120 may provide the IOC in XML format to the audit script generator logic 130. Furthermore, when input information is received via an API, the input information may be in the form of an IOC and may be provided to the audit script generator logic 130 without any parsing IOC generation by the query parser and IOC translator logic 120. Specifically, in one embodiment, input information received via an API may be in the form of an IOC in XML format.

Figure 6:
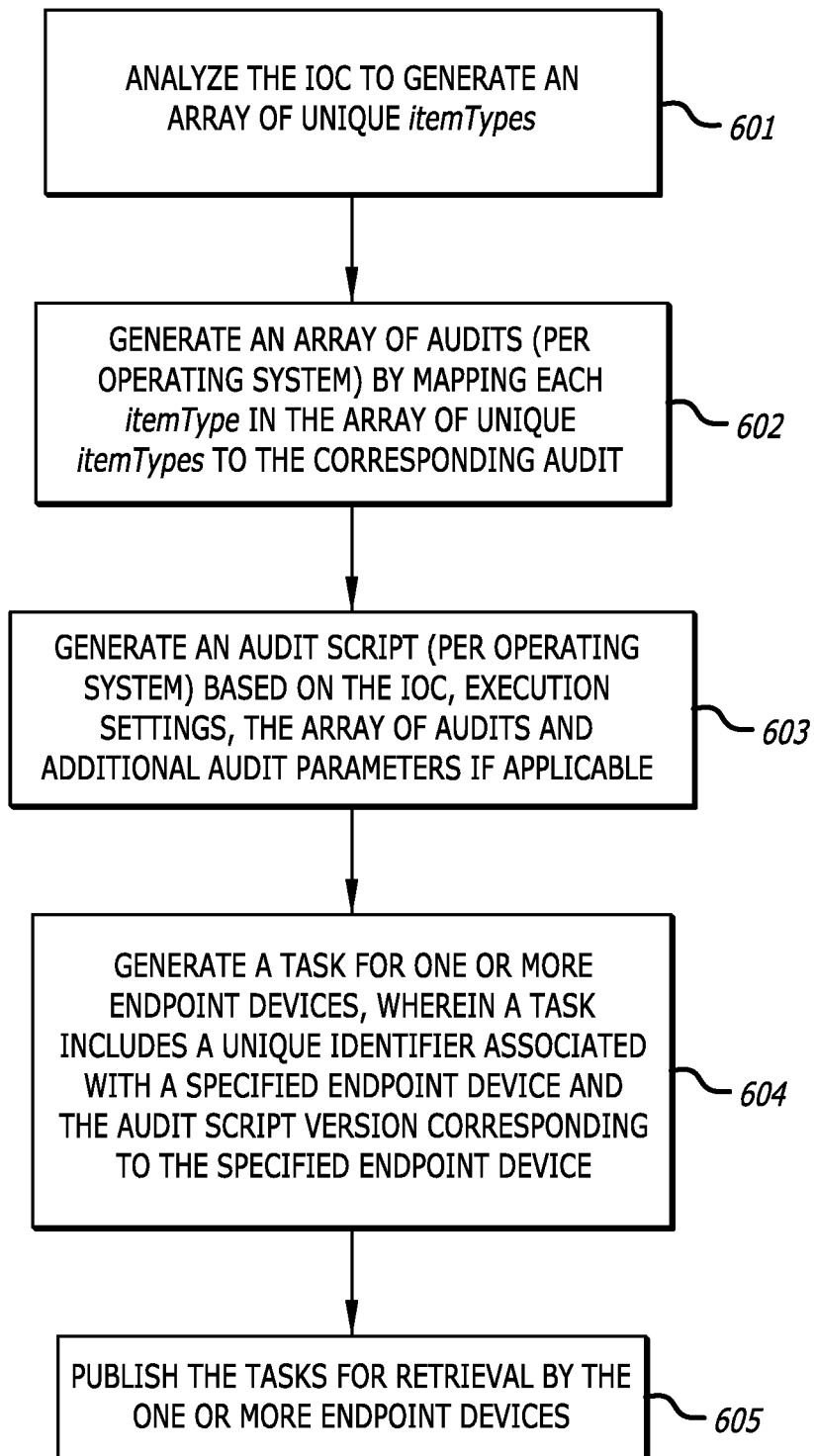
FIG. 6 is a flowchart illustrating an exemplary method for generating an audit script for publishing to one or more targeted endpoint devices with the enterprise search system 100 of FIG. 1.

Referring to FIG. 6, a flowchart illustrating an exemplary method for generating an audit script for publishing to one or more targeted endpoint devices with the enterprise search system 100 of FIG. 1 is shown. Each block illustrated in FIG. 6 represents an operation performed in the method 600 of generating and publishing an audit script by the enterprise search system 100. Referring to block 601 of FIG. 6, the query parser and IOC translator logic 120 of the enterprise search system 100 analyzes an IOC to determine an array of itemTypes. At block 602, the audit script generator logic 130 generates one or more audit lists (e.g., one per operating system) by mapping each itemType in the array of itemTypes to a corresponding audit. At block 603, the audit script generator logic 130 generates one or more audit scripts, e.g., per operating system, based on the IOC, execution settings, the audit lists and additional audit parameters, if applicable. Specifically, the audit script generator logic 130 generates an audit script by compiling the IOC, a list of execution settings, an audit list and one or more additional audit parameters, if applicable, into a predetermined format readable by an agent on an endpoint device. The audit script provides (i) instructions to the agent as to which audit to execute, the execution settings, any audit parameters that are to be set during execution and (ii) the IOC that is to be used in filtering the results returned from the execution of the audits. In one embodiment, the agent may include the audits (e.g., stored on the corresponding endpoint device). In a second embodiment, the audit script may include one or more audits (e.g., which would be retrieved from the audit repository 131).

As with the one or more audit lists, one or more audit scripts may be generated to account for multiple operating systems, wherein all audits corresponding to a first operating system do not necessarily correspond to a second operating system. In such an embodiment, each audit script would include audits corresponding to the operating system of the targeted endpoint device. It has been contemplated that an audit script may be generated that includes one or more audits that do not correspond to the endpoint device that is to download the audit script. For example, a single audit script may be generated and provided to all endpoint devices (e.g., either by (1) a pull method—polling and downloading by an agent on each endpoint device, or (2) a push method—broadcast to all endpoint devices). In such an embodiment, the agent may be configured to execute only those audits that correspond to the operating system of the respective endpoint device. Subsequently, one or more tasks are generated based on the audit scripts as described above. At block 604, the audit script generator logic 130 generates one or more tasks, wherein a task is directed to a specific endpoint device and the task includes (i) a unique identifier associated with the specific endpoint device and (ii) a version of the audit script corresponding to the operating system of the specified endpoint device. At block 605, the one or more task servers $160_1$-$160_M$ publish the one or more tasks for retrieval by the one or more endpoint devices.

IV. Agent

Figure 7:
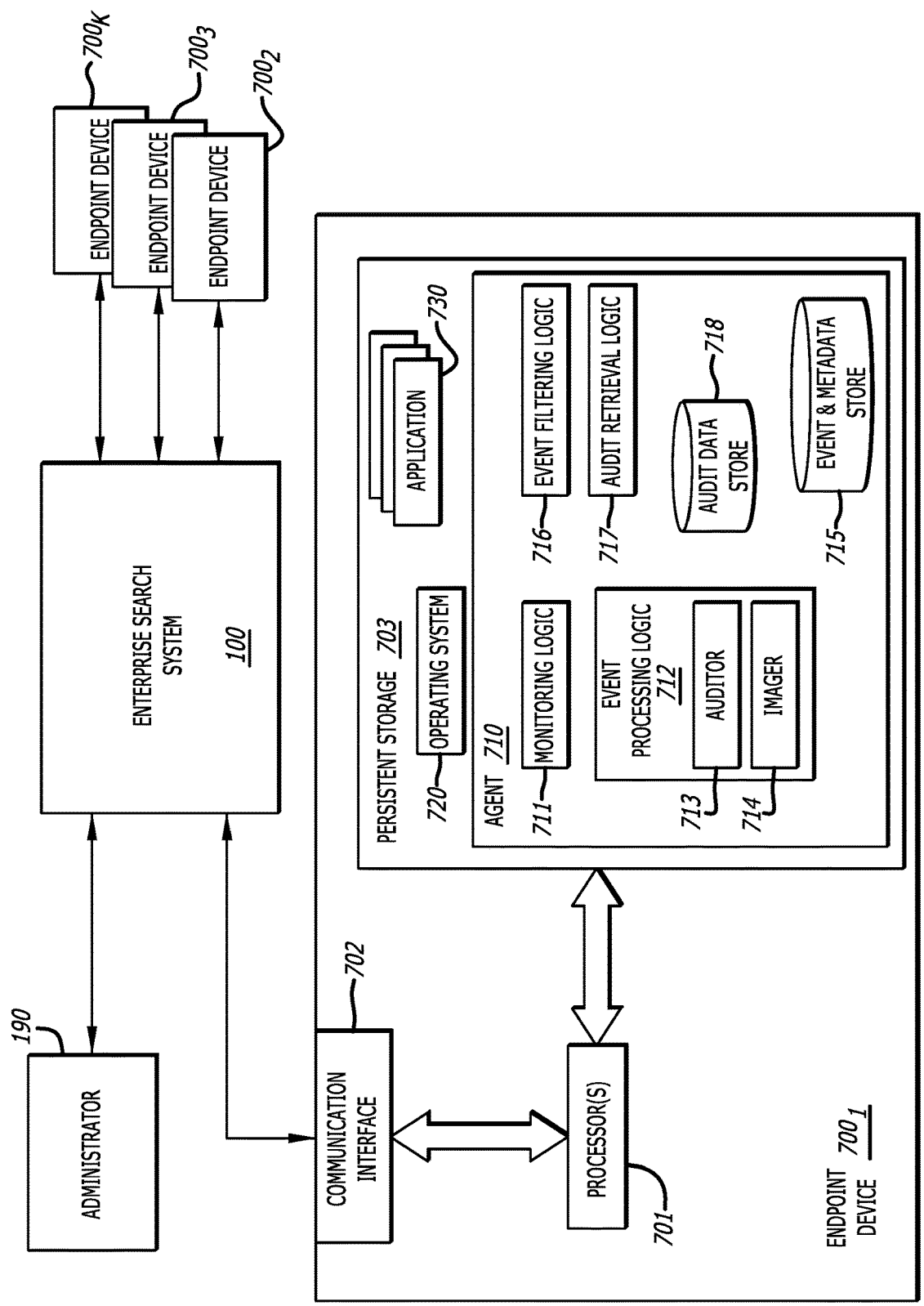
FIG. 7 is an exemplary block diagram of logic components comprising an agent in accordance with an embodiment of the invention.

Referring to FIG. 7, an illustration depicting an agent 710 in accordance with an embodiment of the invention is shown. The agent 710 is an executable software component (logic module) configured to monitor operating attributes of the endpoint device $700_1$ of the endpoint devices $700_1$-$700_K$. The agent 710 is configured to monitor and collect information associated with the endpoint device, and interact with the enterprise search system 100. The agent 750 may receive a transmission from the enterprise search system 100 that includes an audit script, as discussed above. Alternatively, or in addition, the agent 710 may poll (periodically or aperiodically) the enterprise search system 100 for an audit script. Hereinafter, the disclosure will use the phrase "receiving an audit script" to refer to (i) receipt of a transmission including an audit script, and (ii) retrieval of an audit script from the enterprise search system 100. As illustrated, the agent 710 includes (i) a monitoring logic 711, (ii) an event processing logic 712 including at least one auditor 713, and at least one imager 714, (iii) an event and metadata store 715, (iv) an event filtering logic 716, (v) an audit retrieval logic 717, and (vi) an audit data store 718.

Generally, upon receiving an audit script by the audit retrieval logic 717, the event processing logic 712 of the agent 710 parses the audit script to determine the one or more audits listed within the audit script. In one embodiment, the audits are retrieved from the audit data store 718. In an alternative embodiment, one or more audits are included within the audit script. The event processing logic 712 initiates execution of each audit (either simultaneously or at different times wherein execution may be over separate times or may be at least overlapping in part). Upon receiving results from execution of the one or more audits, the event filtering logic 716 applies filter conditions (e.g., of the IOC included within the audit script) to filter the results, which are then be transmitted to the enterprise search system 100 via the communication interface 702.

More specifically, the auditor 713 of the event processing logic 712 executes the one or more audits listed in the audit script received from the enterprise search system 100. The execution of the one or more audits may include processing metadata (with respect to events monitored by the monitoring logic 711, discussed below) stored in the event and metadata store 715. In some embodiments, the execution of the one or more audits may also include scanning the endpoint device $700_1$ for events according to execution of an audit. An event may include, but is not limited or restricted to, state information, memory accesses, process names, time stamp, etc. Events may also include, by way of further example, information associated with a newly created process (e.g., process identifier, time of creation, originating source for creation of the new process, etc.), information about the type and location of certain data structures, information associated with an access to certain communication ports or memory addresses, the contents of the memory or hard drive associated with the endpoint device $700_1$, software and/or hardware configuration information, browser histories, information identifying the software (e.g., type, version, patch) loaded on the endpoint device $700_1$, or the like. The agent 710 may also monitor, store and retrieve execution state and context information, such as the contents of the endpoint device's memory or hard drive. In other embodiments, the monitoring logic 711 may scan content being processed by the endpoint device $700_1$ and monitor prospective events.

Some embodiments of the disclosure may include a plurality of auditors 730, each constituting a discrete software module that collects a specific kind of information from the endpoint device, such as current execution and data states. Other examples of an auditor 713 include modules adapted to collect process listings, system configuration settings, network connection state listings, browser history, and file listings. The imager 714 of the event processing logic 712 obtains verbatim copies of data stored on the endpoint device $700_1$. Examples of the imager 714 include modules that perform disk acquisition, memory acquisition, and file acquisition. Some embodiments of the disclosure may include a plurality of imagers 714, each constituting a discrete software module.

The event filtering logic 716 of the agent 710 is responsible for applying the filter conditions to the results (e.g., data and metadata) obtained by the auditor 713 during execution of the one or more audits, so that a specific, refined set of search results can be provided in response to the audit query.

As mentioned above, the monitoring logic 711 of the agent 710 may be configured to monitor and store metadata including, information related to attributes occurring during or associated with processing by and operation of the endpoint device $700_1$ (e.g., "events"). To accomplish this, the monitoring logic 711 is adapted with suitable programmatic interfaces to interact with the operating system 720 and/or applications 730 (processes) running on the endpoint device $700_1$.

The agent 710 communicates the events, or, in some embodiments, the filtered events, of the endpoint device $700_1$ via the communication interface 702 of the endpoint device $700_1$ over a network to another network device, in this case, the enterprise search system 100.

Further information regarding an embodiment of an agent may be had with reference to U.S. Pat. No. 8,949,257 issued Feb. 3, 2015, entitled "Method and System for Collecting and Organizing Data Corresponding to an Event," the full disclosure of which being incorporated herein by reference.

Although the disclosure is primarily directed to detection cyber-threats, alternative embodiments and implementations have been contemplated and the disclosure should not be limited in scope. In particular, as referenced above, aspects of the invention find application both (1) in conducting a cyber-threat investigation, such as a cyber-attack incidence response, or an in-depth forensic investigation to ascertain whether or not a network or its endpoint devices have been compromised, and (2) in-depth forensic investigation that does not necessarily involve a cyber-threat investigation, but instead, for example, provides analytics to an administrator regarding the status and configuration of the network and endpoint devices connected thereto.

In the foregoing description, the invention is described with reference to specific exemplary embodiments thereof. It will, however, be evident that various modifications and changes may be made thereto without departing from the broader spirit and scope of the invention as set forth in the appended claims. As mentioned above, while specific embodiments are described herein, the invention is not to be limited to these embodiments, the invention is to be understood as not limited by the specific embodiments described herein, but only by scope of the appended claims. Features and details from one or more described embodiments may also be combined, added or removed to form other embodiments within the scope of the invention, as the described embodiments are merely exemplary of various features.

What is claimed is:

1. A computerized method comprising:
providing input information to an external source to generate a response from the external source, the response including one or more audits to be operated on an endpoint device, wherein the one or more audits are determined by the source by at least selecting the one or more audits from a plurality of pre-established audits and are based on at least one operational attribute of the endpoint device included in a query formed by the input information;
receiving the response including at least the one or more audits that are broadcast to one or more endpoint devices including the endpoint device, wherein an agent deployed within the endpoint device is configured to select the one or more audits that are appropriate to a configuration of the endpoint device; and
performing, by the agent of the endpoint device, an automated, computerized search for the at least one operational attribute of the endpoint device by at least executing one or more tasks associated with each audit of the one or more audits,
inspecting, monitoring, and acquiring data based on the executing of the one or more tasks,
applying filtering conditions on the acquired data to generate filtered results, each filtering condition is generated based on at least one operational sub-attribute associated with an operational attribute of the at least one operational attribute included as part of a token being at least a portion of the input information, wherein the token includes (i) a field component identifying a characteristic the operational attribute, (ii) a value component representing a search term, and (iii) an operator component representing an operation to be conducted between the field component and the value component; and
returning the filtered results to a source of the one or more audits.

2. The method of claim 1, wherein each of the one or more audits corresponds to an executable script and the at least one operational attribute corresponds to an indicator of compromise (IOC).

3. The method of claim 2, wherein each of the filtering conditions is generated based on an operational attribute and the at least one sub-attribute associated with the operational attribute included in the input information of the query entered via a query bar.

4. The method of claim 3, wherein the at least one operational attribute corresponds to a browser history and the one or more sub-attributes corresponds to at least a prescribed Uniform Resource Locator (URL).

5. The method of claim 1, wherein each of the plurality of pre-established audits is configured to search for data requested in the query.

6. The method of claim 1, wherein the inspecting, monitoring, and acquiring data based on the executing of the one or more tasks comprises gathering data stored in data stores by the agent, the data stores being accessible in or by the endpoint device.

7. An endpoint device comprising:
one or more processors;
a persistent storage accessible by the one or more processors, the persistent storage including an agent that is, when executed by the one or more processors, configured to (i) receive at least one or more audits selected from a plurality of pre-established audits by an external source and received as a broadcast to one or more endpoint devices including the endpoint device, (ii) select the one or more audits that are appropriate to a configuration of the endpoint device by the agent, (iii) execute one or more tasks associated with each audit of the one or more audits, (iv) inspect and acquire data based on execution of the one or more tasks, (v) apply filtering conditions on the acquired data to generate filtered results, and (vi) return the filtered results to the external source,
wherein each of the filtering conditions is generated based on at least one operational sub-attribute associated with an operational attribute included as part of a token at least included as part of input information provided to the source to produce a search query that prompted return of the one or more audits in response to the input information, wherein the token includes (i) a field component identifying a characteristic the operational attribute, (ii) a value component representing a search term, and (iii) an operator component representing an operation to be conducted between the field component and the value component.

8. The endpoint device of claim 7, wherein the agent is configured to communicate with an enterprise search system operating as the external source by at least providing the input information to the enterprise search system configured to form the query based on the input information, determine the one or more audits based on the at least one operational sub-attribute and the operational attribute included in the query, and return the one or more audits to the endpoint device.

9. The endpoint device of claim 8, wherein the agent being configured to apply the filtering conditions that are generated based at least on one or more sub-attributes including the at least one operational sub-attribute included in the query.

10. The endpoint device of claim 7, wherein each of the one or more audits corresponds to an executable script.

11. A computerized method performed by an enterprise search system to conduct automated searches directed to one or more endpoint devices for at least one operational attribute, the method comprising:
receiving input information including at least one or more tokens including a first token, the first token comprises (i) a field component identifying a characteristic a first operational attribute of the at least one operational attribute, (ii) a value component representing a search term, and (iii) an operator component representing an operation to be conducted between the field component and the value component;
forming a query based on the input information;
determining at least one or more audits based on at least one operational attribute included in the query, wherein each of the one or more audits corresponds to one or more executable scripts and the one or more audits are determined by the source by at least selecting the one or more audits from a plurality of pre-established audits and;
transmitting at least the one or more audits in a broadcast to the one or more endpoint devices, wherein an agent deployed within an endpoint device of the one or more endpoint devices is configured to select the one or more audits that are appropriate to a configuration of the endpoint device; and
retrieving filtered results based on execution of one or more audits by the one or more endpoint devices including the endpoint device, wherein the filtered results are based on applying one or more filtering conditions to results of the one or more audits, a filtering condition of the one or more filtering conditions is generated based on information associated with the first operational attribute included as part of the token provided in the query.

12. The method of claim 11, wherein the at least one operational attribute corresponds to an indicator of compromise (IOC).

13. The method of claim 12, wherein the at least one operational attribute corresponds to a browser history and the one or more sub-attributes corresponds to at least a prescribed Uniform Resource Locator (URL).

14. The method of claim 11, wherein each of the plurality of pre-established audits is configured to search for data requested in the query.

* * * * *